US011216950B2

(12) United States Patent
Cho et al.

(10) Patent No.: US 11,216,950 B2
(45) Date of Patent: Jan. 4, 2022

(54) METHOD AND SYSTEM FOR AUTOMATICALLY SEGMENTING BLOOD VESSEL IN MEDICAL IMAGE BY USING MACHINE LEARNING AND IMAGE PROCESSING ALGORITHM

(71) Applicant: AI MEDIC INC., Seoul (KR)

(72) Inventors: Han Yong Cho, Yongin-si (KR); Soon Sung Kwon, Seoul (KR); Woo Sang Cho, Yongin-si (KR)

(73) Assignee: AI MEDIC INC., Seoul (KR)

( * ) Notice: Subject to any disclaimer, the term of this patent is extended or adjusted under 35 U.S.C. 154(b) by 0 days.

(21) Appl. No.: 17/273,504

(22) PCT Filed: Sep. 5, 2019

(86) PCT No.: PCT/KR2019/011438
§ 371 (c)(1),
(2) Date: Mar. 4, 2021

(87) PCT Pub. No.: WO2020/050635
PCT Pub. Date: Mar. 12, 2020

(65) Prior Publication Data
US 2021/0209766 A1    Jul. 8, 2021

(30) Foreign Application Priority Data

Sep. 5, 2018 (KR) .................. 10-2018-0105726

(51) Int. Cl.
*G06T 7/11*     (2017.01)
*G06T 5/00*     (2006.01)
*G06T 7/00*     (2017.01)

(52) U.S. Cl.
CPC ............. *G06T 7/11* (2017.01); *G06T 5/002* (2013.01); *G06T 7/0014* (2013.01);
(Continued)

(58) Field of Classification Search
None
See application file for complete search history.

(56) References Cited

U.S. PATENT DOCUMENTS

| 6,754,376 B1 | 6/2004 | Turek et al. |
| 2011/0206247 A1 | 8/2011 | Dachille et al. |

(Continued)

FOREIGN PATENT DOCUMENTS

| JP | 2016-016265 A | 2/2016 |
| KR | 10-2008-0053057 A | 6/2008 |

(Continued)

OTHER PUBLICATIONS

Kwon et al., "A novel patient-specific model to compute coronary fractional flow reserve.", Progress in biophysics and molecular biology, 2014, pp. 48-55, vol. 116. 1.

(Continued)

*Primary Examiner* — Jiangeng Sun
(74) *Attorney, Agent, or Firm* — Jae Youn Kim; Novick, Kim & Lee, PLLC

(57) ABSTRACT

A method for automatically segmenting three-dimensional blood vessel data from three-dimensional medical image data of a patient through the use of a computer is provided. The method includes: receiving the three-dimensional medical image data of the patient; generating three-dimensional shape machine-learning blood vessel data from the received three-dimensional medical image data through the use of a machine-learned segmentation program so as to generate three-dimensional blood vessel data; and generating corrected three-dimensional shape blood vessel data from the received three-dimensional medical image data and the generated three-dimensional shape machine-learning blood vessel data through the use of an image processing program.

6 Claims, 10 Drawing Sheets

(52) U.S. Cl.
CPC ............. *G06T 2207/10028* (2013.01); *G06T 2207/20081* (2013.01); *G06T 2207/20084* (2013.01); *G06T 2207/20182* (2013.01); *G06T 2207/30101* (2013.01)

(56) References Cited

U.S. PATENT DOCUMENTS

| | | | |
|---|---|---|---|
| 2012/0203530 A1 | 8/2012 | Sharma et al. | |
| 2017/0262981 A1 | 9/2017 | Gulsun et al. | |
| 2018/0177461 A1* | 6/2018 | Bell | A61B 5/0095 |
| 2018/0240235 A1* | 8/2018 | Mazo | G06T 7/0012 |
| 2018/0247405 A1 | 8/2018 | Kisilev et al. | |
| 2019/0333199 A1* | 10/2019 | Ozcan | G06N 3/088 |
| 2021/0174523 A1* | 6/2021 | Kaethner | G06T 7/337 |
| 2021/0248409 A1* | 8/2021 | Iyer | G06K 9/6271 |

FOREIGN PATENT DOCUMENTS

| | | |
|---|---|---|
| KR | 10-1857624 B1 | 5/2018 |
| KR | 10-2018-0097035 A | 8/2018 |

OTHER PUBLICATIONS

S. Manoj et al., "Neural Network Based Classifier for Retinal Blood Vessel Segmentation.", International Journal of Recent Trends in Electrical & Electronics Engineering 3.1, 2013, pp. 44-53.

Moeskops et al., "Deep learning for multi-task medical image segmentation in multiple modalities." International Conference on Medical Image Computing and Computer-Assisted Intervention, 2016, pp. 1-9.

Long et al.,"Fully convolutional networks for semantic segmentation.", Proceedings of the IEEE conference on computervision and pattern recognition, 2015, pp. 1-10.

Goodfellow et al., "Generative adversarial nets.", Advances in neural information processing systems., 2014, pp. 1-9.

Xiaoming Liu et al., "Automatic Organ Segmentation for CT Scans Based on Super-Pixel and Convolutional Neutral Networks", Journal of Digital Imaging, Apr. 30, 2018.

Huiyan Jiang et al., "A Region Growing Vessel Segmentation Algorithm Based on Spectrum Information" Computational and Mathematical Methods in Medicine, Nov. 13, 2013, pp. 1-10.

Wei-Chih Hung et al., "Adversarial Learning for Semi-Supervised Semantic Segmentation", arXiv.org., Feb. 22, 2018, pp. 1-17.

* cited by examiner

METHOD AND SYSTEM FOR AUTOMATICALLY SEGMENTING BLOOD VESSEL IN MEDICAL IMAGE BY USING MACHINE LEARNING AND IMAGE PROCESSING ALGORITHM

TECHNICAL FIELD

The present invention relates to a method and system for automatically segmenting a blood vessel from medical image data. More specifically, the present invention relates to a method and system for automatically segmenting a blood vessel in a medical image by using machine learning and an image processing algorithm.

BACKGROUND ART

The three-dimensional medical image data includes information on various parts of the human body such as blood vessels and bones of a patient. In order to diagnose and treat a patient with a blood vessel abnormality, it is necessary to perform an operation of extracting blood vessels from three-dimensional medical image data and segmenting them. Currently, in the medical field, most of the operations of analyzing three-dimensional medical image data and extracting and segmenting blood vessels are performed manually. In the case of manually segmenting blood vessels, it takes a long time to segment the blood vessels, and errors in blood vessel segmentation may occur due to mistakes of an operator (doctor or technician). There is a problem that it is difficult to achieve standardization for obtaining the same result for each operator for the same three-dimensional medical image.

A technique that automatically detects blood vessels from three-dimensional medical image data without intervention of an operator, segments the blood vessels, and reconstructs the blood vessels into three-dimensional shape data can diagnose, treat and monitor diseases related to blood vessels more quickly and accurately.

For example, Non-Patent Document 1 discloses a technique (CT-FFR technique) in which a three-dimensional shape of a coronary artery is constructed from a patient's cardiac CT image, and hemodynamic simulation is performed on a three-dimensional coronary artery to non-invasively predict an FFR value and diagnose a coronary artery disease. If the coronary artery can be automatically detected from a cardiac CT image and can be segmented, it is possible to more quickly and accurately diagnose a disease caused by stenosis of the coronary artery through the use of the CT image. In addition, Patent Document 1 discloses a technique for constructing a three-dimensional shape of a cerebral blood vessel from medical images, and predicting the function of the cerebral blood vessel by performing fluid structure interaction modeling (FSI) and simulation. If the three-dimensional shape of the cerebral blood vessel can be automatically detected from the three-dimensional images of the brain and can be segmented, it is possible to quickly grasp the anatomical state of the cerebral blood vessel and utilize it for diagnosis. In addition, it is possible to predict the pressure and velocity of a blood flow in the cerebral blood vessel by performing rapid and accurate simulation for the cerebral blood vessel. Furthermore, it is possible to functionally grasp the state of the cerebral blood vessel, and use it for diagnosis.

Recently, a technology for segmenting a blood vessel through the use of machine learning has been developed. Patent Literature 2 discloses a technique for segmenting a blood vessel from a voxel through the use of a trained vessel orientation tensor classifier. In addition, techniques for segmenting blood vessels through the use of machine learning are disclosed in Non-Patent Documents 2 to 4. In addition, Patent Document 3 discloses a technique for automatically segmenting a blood vessel from three-dimensional medical image data through the intervention of a user.

As a result of the segmentation of a blood vessel attempted by the present inventors through the use of machine learning, it was found that there are a case where the portion which is not a blood vessel is segmented as a blood vessel (noise or outlier generation) and a case where the portion which is a blood vessel is excluded from the segmentation as if it is not a blood vessel (missing of a blood vessel region). As the cause of this error, it is presumed that the amount of data used for machine learning is insufficient, or incorrectly labeled mask data is used for machine learning. Eventually, it was found that if a blood vessel is segmented by a machine learning method at the current technical level, it is difficult to avoid some degree of blood vessel noise and missing of a blood vessel.

On the other hand, if a blood vessel is segmented from three-dimensional medical image data through the use of a known image processing algorithm, it is impossible to completely automate the segmentation of a blood vessel because the image processing algorithm known so far is not perfect. Particularly, in the segmentation of a coronary artery or the segmentation of a cerebral blood vessel, a method of completely and automatically segmenting the accurate shape and dimensions of a blood vessel to such a level as to enable hemodynamics simulation has not been developed. Therefore, it is necessary for an operator to input a seed before the start of segmentation, or it is necessary for an operator to remove or correct an erroneously segmented region during or after segmentation.

PRIOR ART DOCUMENT

Patent Document

1. US 2012/0203530 A1, METHOD AND SYSTEM FOR PATIENTS SPECIFIC COMPUTATIONAL MODELING AND SIMULATION FOR COUPLED HEMODYNAMIC ANALYSIS OF CEREBRAL VESSELS
2. US 2017/0262981 A1, METHOD AND SYSTEM FOR MACHINE LEARNING BASED ESTIMATION OF ANISOTROPIC VESSEL ORIENTATION TENSOR
3. U.S. Pat. No. 6,754,376 B1, METHOD FOR AUTOMATIC SEGMENTATION OF MEDICAL IMAGES

Non-Patent Document

1. Kwon, Soon-Sung, et al. "A novel patient-specific model to compute coronary fractional flow reserve." Progress in biophysics and molecular biology 116.1 (2014): 48-55.
2. Manoj, S., Sandeep PM Muralidharan, and M. Sandeep. "Neural network based classifier for retinal blood vessel segmentation." International Journal of Recent Trends in Electrical & Electronics Engineering 3.1 (2013): 44-53.
3. Moeskops, Pim, et al. "Deep learning for multi-task medical image segmentation in multiple modalities." International Conference on Medical Image Computing and Computer-Assisted Intervention. Springer, Cham, 2016.
4. Long, Jonathan, Evan Shelhamer, and Trevor Darrell. "Fully convolutional networks for semantic segmentation." Proceedings of the IEEE conference on computer vision and pattern recognition. 2015.
5. Good fellow, Ian, et al. "Generative adversarial nets." Advances in neural information processing systems. 2014.

SUMMARY

There is a need for a new method and system capable of fully automatically segmenting three-dimensional shape blood vessel data from three-dimensional medical image data in a rapid and accurate manner without intervention of an operator. An object of the present invention is to provide a novel blood vessel segmentation method and system that can meet such a need.

In particular, the present invention provides a new method and system capable of automatically segmenting a blood vessel without intervention of an operator by supplementing the deficiencies of a segmentation method using machine learning with a segmentation method using an image processing algorithm.

The method for segmenting three-dimensional blood vessel data from three-dimensional medical image data of a patient according to the present invention is executed in the form of a program in a computer system. The method for automatically segmenting three-dimensional blood vessel data according to the present invention includes: receiving a three-dimensional medical image data of a patient; generating three-dimensional shape machine-learning blood vessel data from the received three-dimensional medical image data through the use of a machine-learned segmentation program so as to generate three-dimensional blood vessel data; and generating corrected three-dimensional shape blood vessel data from the received three-dimensional medical image data and the generated three-dimensional shape machine-learning blood vessel data through the use of an image processing program. Furthermore, the three-dimensional machine-learning blood vessel data is composed of at least one noise data set other than a blood vessel region and a data set in which the blood vessel region is missing, and the image processing program is configured to compare the received three-dimensional medical image data and the generated three-dimensional shape machine-learning blood vessel data to match the blood vessel region, supplement the missing data set, and remove the noise data set, so as to generate corrected three-dimensional shape blood vessel data.

In the present invention, the three-dimensional medical image data may include CT images, MRI images and ultrasound images. The machine-learned segmentation program may include a convolutional neural network (CNN) algorithm and a fully convolutional network (FCN) algorithm.

In some embodiments, the machine-learned segmentation program may include a FCN algorithm. The FCN algorithm of the machine-learned segmentation program may be configured to convert axial slice images of three-dimensional medical images into bitmap images, label a blood vessel region of each of the converted bitmap images, convert each of the labeled bitmap images into a mask image to utilize the mask image as learning data, and perform learning by using each of the labeled bitmap images and the mask image as a pair.

In some embodiments, the machine-learned segmentation program may further include a GAN algorithm.

In some embodiments, the image processing program may be configured to supplement the missing data set through the use of a region growing algorithm for the blood vessel region of the received three-dimensional medical image data by using coordinate information of the generated three-dimensional shape blood vessel data as a seed, calculate a volume of the three-dimensional shape blood vessel data sets to which the missing data region is connected, determine blood vessel data whose calculated volume is equal to or less than a predetermined value as a noise data set, and remove the noise data set.

In some embodiments, the image processing program may be configured to segment a blood vessel region of the received three-dimensional medical image data by using coordinate information of the generated three-dimensional shape blood vessel data as a seed, calculate a volume of the segmented three-dimensional shape blood vessel data, determine blood vessel data whose calculated volume is equal to or less than a predetermined value as a noise data set, and remove the noise data set.

According to another aspect of the present invention, a medical image processing system for converting three-dimensional medical image data of a patient into three-dimensional blood vessel data through the use of a computer is provided. The system according to the present invention includes a computer installed with a computer program for performing the method recited above.

A method for automatically segmenting three-dimensional blood vessel data from three-dimensional medical image data of a patient through the use of a computer includes: receiving the three-dimensional medical image data of the patient; generating primary three-dimensional shape machine-learning blood vessel data by processing the received three-dimensional medical image data through the use of an artificial intelligence neural network; and generating secondary three-dimensional shape blood vessel data by processing the primary three-dimensional medical image data, wherein the act of generating secondary three-dimensional shape blood vessel data generates the secondary three-dimensional shape blood vessel data by using the primary three-dimensional shape machine-learning blood vessel data as a seed. In the present invention, the artificial intelligence neural network may include a CNN or a FCN.

In some embodiments, the act of generating the primary three-dimensional shape machine-learning blood vessel data through the use of the artificial intelligence neural network may include: constructing the artificial intelligence neural network; causing the artificial intelligence neural network to perform learning by processing three-dimensional medical images of a plurality of patients; and primarily segmenting the three-dimensional medical images of the patients, which is not used as a learning material in the learned artificial intelligence neural network. Furthermore, the act of constructing the artificial intelligence neural network includes: constructing a FCN for initial learning; using the FCN as a generator module to improve the neural network performance by applying a GAN algorithm; and constructing an inspector module to perform the GAN algorithm.

In the present invention, the three-dimensional shape blood vessel data primarily generated through the use of the artificial intelligence neural network may be composed of at least one noise data set other than a blood vessel region and at least one missing data set in which the blood vessel region is missing.

In some embodiments, the act of generating the secondary three-dimensional shape blood vessel data may include: matching the blood vessel region by comparing the primary three-dimensional shape blood vessel data with the received three-dimensional image data; connecting the blood vessel by supplement the missing data set; and removing the noise data set. Furthermore, the act of connecting the blood vessel by supplementing the missing data set may connect a missing data region through the use of a region growing algorithm for the blood vessel region of the received three-dimensional image data by using coordinate information of the generated primary three-dimensional shape blood vessel data as a seed. In addition, the act of removing the noise data set may include: calculating a volume of the three-dimensional blood vessel data sets to which the missing data region is connected; determining a blood vessel data set whose calculated volume is equal to or less than a predetermined value as noise data; and removing the blood vessel data set.

The method for segmenting three-dimensional blood vessel data from three-dimensional medical image data of a patient according to the present invention completely automatically segments the three-dimensional blood vessel data by supplementing the disadvantages of the machine learning and the image processing algorithm.

The method according to the present invention uses the three-dimensional shape blood vessel data generated by machine learning as a seed of an image processing algorithm. The three-dimensional shape blood vessel data generated by machine learning is that includes a noise data set having a segmented portion other than a blood vessel and does not include data for a blood vessel region. The three-dimensional image processing algorithm processes the original medical image data by using the three-dimensional shape blood vessel data generated by inaccurate machine learning as a seed. Thus, three-dimensional shape blood vessel data is generated by supplementing and connecting a missing blood vessel data set and removing a noise data set.

Accordingly, the method according to the present invention can completely automatically generate three-dimensional shape blood vessel data in a rapid and accurate manner without intervention of an operator.

DETAILED DESCRIPTION

Hereinafter, a method for automatically segmenting three-dimensional blood vessel data according to one embodiment of the present invention will be described with reference to the accompanying drawings.

Figure 1:
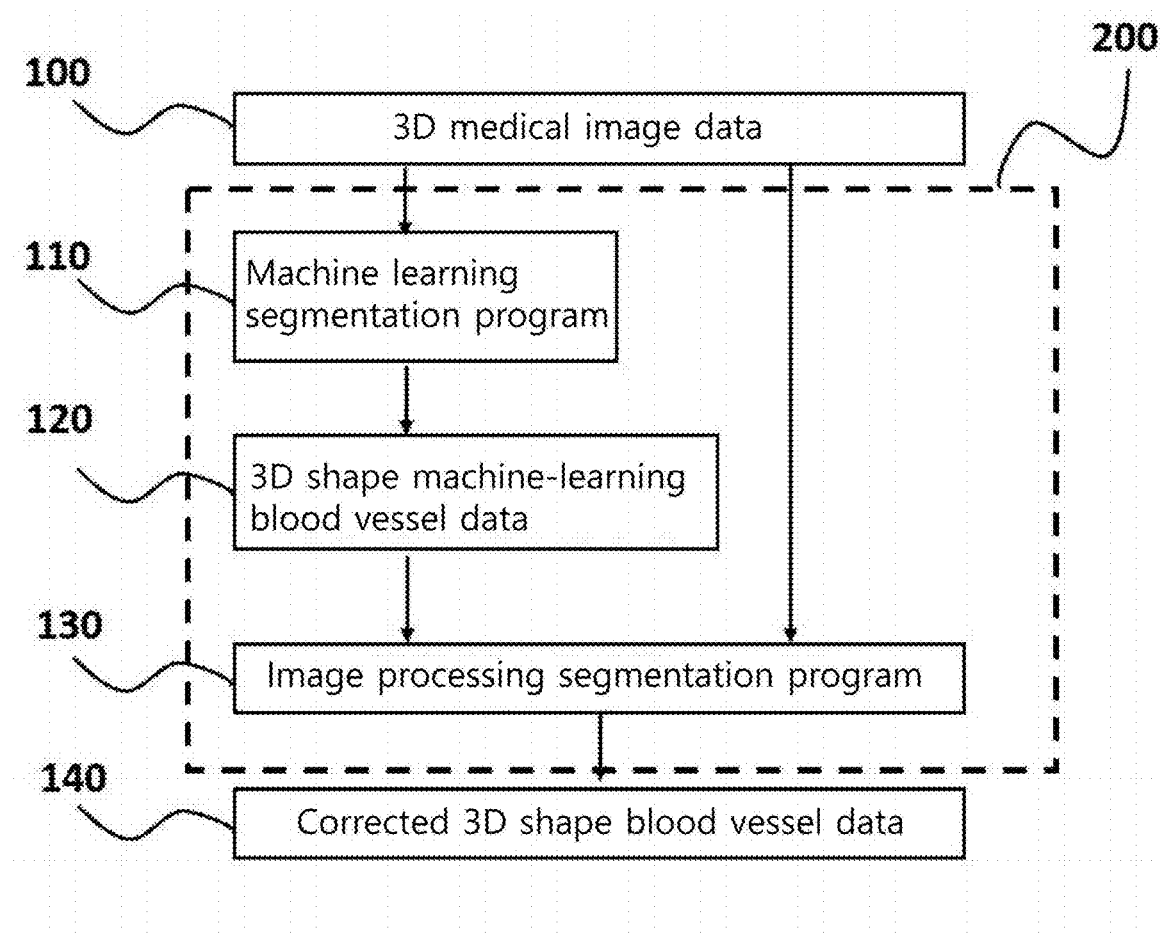
FIG. 1 is a schematic diagram showing the configuration of a medical image processing system according to the present invention.

FIG. 1 is a schematic diagram showing the configuration of a medical image processing system according to the present invention. The three-dimensional medical image processing system 200 according to the present invention may use a typical computer system or may be a device embedded in a system of a three-dimensional medical image acquisition device such as a CT imaging device or the like. The typical computer system includes a processor, a memory, a storage, an input/output device and a communication device, and includes an operating system and an application program.

A method for segmenting three-dimensional blood vessel data from three-dimensional medical image data of a patient according to the present invention is executed in a computer system 200 in the form of a program. The image processing system 200 includes a machine learning segmentation program 110 and an image processing segmentation program 130 as application programs. The machine learning segmentation program 110 receives three-dimensional medical image data 100 (which may preferably be, but is not limited to, a DICOM standard format file), and generates and outputs three-dimensional shape machine-learning blood vessel data 120. The outputted three-dimensional shape machine-learning blood vessel data 120 is stored in the memory of the image processing system 200. The three-dimensional shape machine-learning blood vessel data 120 is inaccurate data that includes a noise data set having a segmented portion other than a blood vessel and does not include data for a blood vessel region. The image processing segmentation program 130 receives the three-dimensional shape machine-learning blood vessel data 120 generated by the machine-learning segmentation program 130 and the three-dimensional medical image data 100, and generates and outputs corrected three-dimensional shape blood vessel data 140. The corrected three-dimensional blood vessel data 140 is three-dimensional blood vessel data to which missing blood vessel region data is connected and from which noise is removed.

Hereinafter, the machine learning segmentation program 110 will be described with reference to FIGS. 2 to 9.

In order to perform three-dimensional blood vessel segmentation from three-dimensional medical images using a machine learning or deep learning algorithm, it is necessary to first construct a convolutional neural network (CNN) or a fully convolutional network (FCN) to perform learning on a neural network. For machine learning, original image data including blood vessels and labeled data representing a blood vessel region in the original images are required. In this specification, neural networks for learning such as the CNN, the FCN and the like are referred to as artificial intelligence neural networks.

Figure 2A:
FIG. 2A is an original cardiac CT image for machine learning.
Figure 2B:
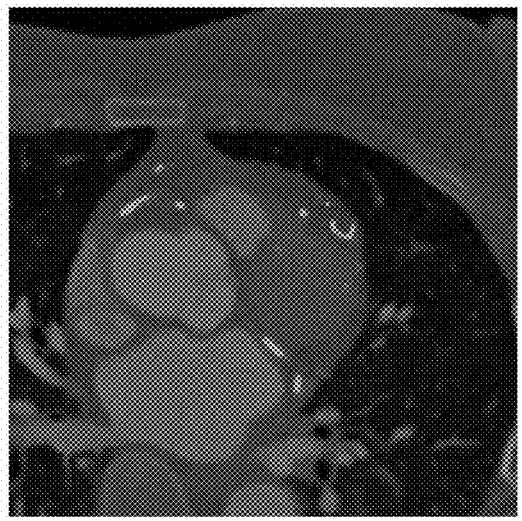
FIG. 2B is an image obtained by labeling a blood vessel region in the original image of FIG. 2A.

FIG. 2A is an original cardiac CT image, and FIG. 2B is an image obtained by labeling a blood vessel region in the original image of FIG. 2A to create a mask image which is a ground truth image used for machine learning. The labeling is performed by a specialist who has the anatomical knowledge of cardiac blood vessels and has the ability to interpret CT images.

Figure 3:
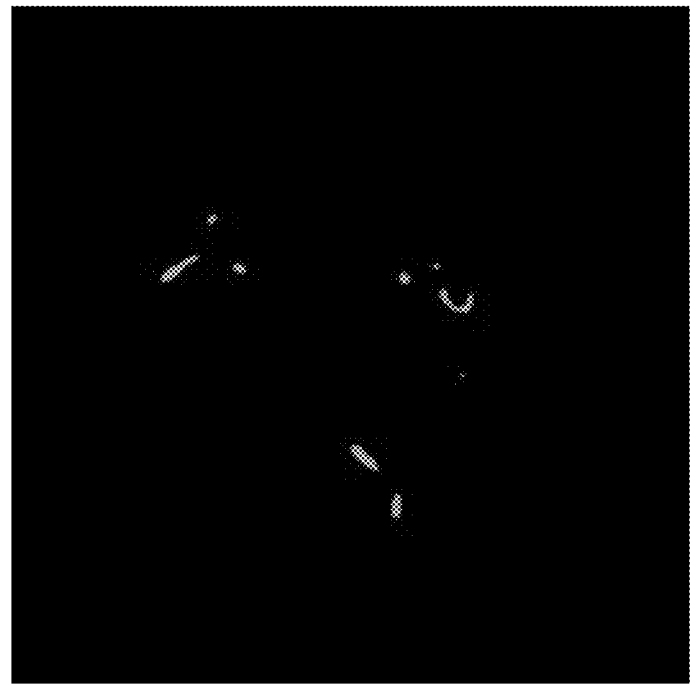
FIG. 3 is a mask image created by using the labeled image of FIG. 2B for use in machine learning.

FIG. 3 is a mask image created by using the labeled image of FIG. 2B for use in machine learning. The mask image is created for the purpose of separating only the labeled portion and directly using it for neural network learning. In the present embodiment, in the mask image, as shown in FIG. 2B, FIG. 3, FIG. 4B, FIG. 7 (see the mask image), and FIG. 8, the labeled (segmented) portion is indicated as brighter regions, and all other regions are indicated as darker than the labeled portion. The mask image indicated with the brighter regions provides information on the location and area of a blood vessel in the original image of FIG. 2A.

Figure 4A:
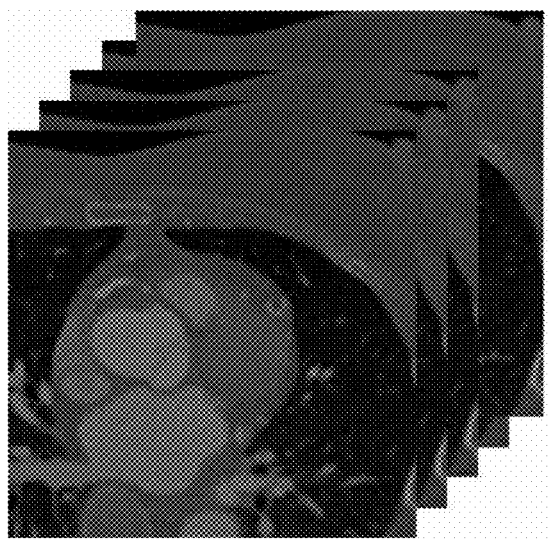
FIG. 4A shows an original image set for neural network learning.
Figure 4B:
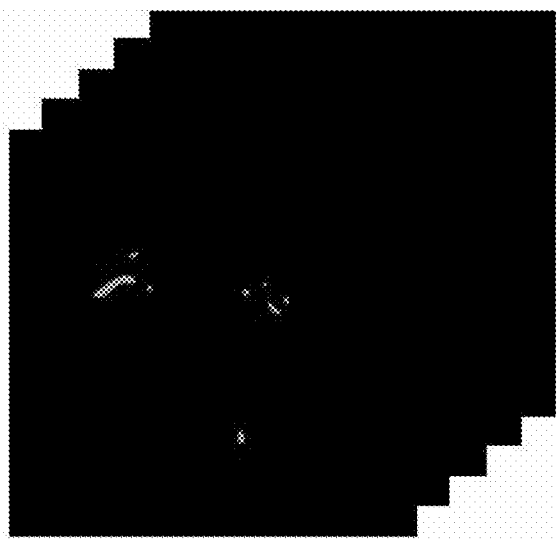
FIG. 4B shows a mask image set for neural network learning.

FIG. 4 shows an original image set and a mask image set for neural network learning. The data for neural network learning is composed of a pair of an original image and a mask image corresponding to the original image, as shown in FIG. 4. In general, when a patient is imaged by medical imaging device such as a CT, a MRA or the like, about 100 to 300 axial sheet images are generated. Therefore, the learning data for one case includes about 200 to 600 sheets which are twice the number of medical image data sheets.

A medical image is composed of individual slices sequentially connected based on the Z-axis. As a result, the medical image has a feature that the location of the blood vessel to be segmented is not moved or changed much as compared with the previous slice. Through the above feature, each slice is not inputted into the neural network, but k images in the +Z axis direction and k images in the −Z axis direction are stacked in one slice (windowing technique), whereby data including information on the preceding and subsequent blood vessels is inputted into the neural network. The windowing technique provides information on the blood vessel location and the blood vessel connection in a medical image. Therefore, the windowing technique has an advantage in that it is not necessary to repeatedly perform pixel-based learning. The windowing technique is helpful in improving performance. The windowing technique is differentiated from voxel-based learning, which is mainly used in the existing method for segmenting a blood vessel through machine learning. In the present invention, only the pixel-based learning is performed. The data composed of ±k slices is used only to provide information on blood vessels to the neural network, and is not directly used for learning. When the windowing technique is applied, the layer is composed of ±k slices based on the Z-axis as suggested above. Therefore, in the slice where the target blood vessel exists and the ±k slices, there must be a section where the blood vessels overlap.

Figure 5:
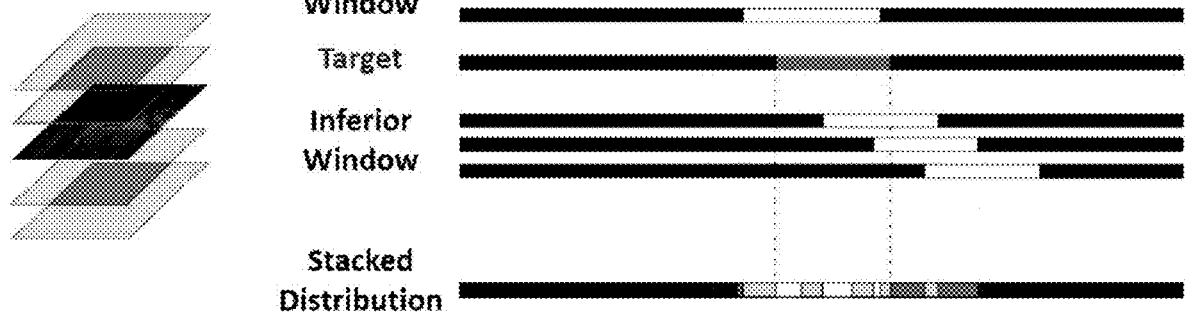
FIG. 5 is an explanatory diagram showing the distribution of overlapping portions of a blood vessel as a segmentation target when applying a windowing technique in which ±k slices are overlapped.

FIG. 5 shows the distribution of overlapping portions of blood vessels as a segmentation target when applying the windowing technique in which ±k slices are overlapped. As a result, the input data for providing information on the preceding and subsequent blood vessels in the neural network is not a single image, but 2k+1 windowing stacks. When the pixel sizes of a medical image in the X-axis and Y-axis are defined as x and y, respectively, the stacks become a (x, y, 2k+1) dimension tensor. However, as suggested above, the stacks are not directly used for neural network learning.

Figure 6:
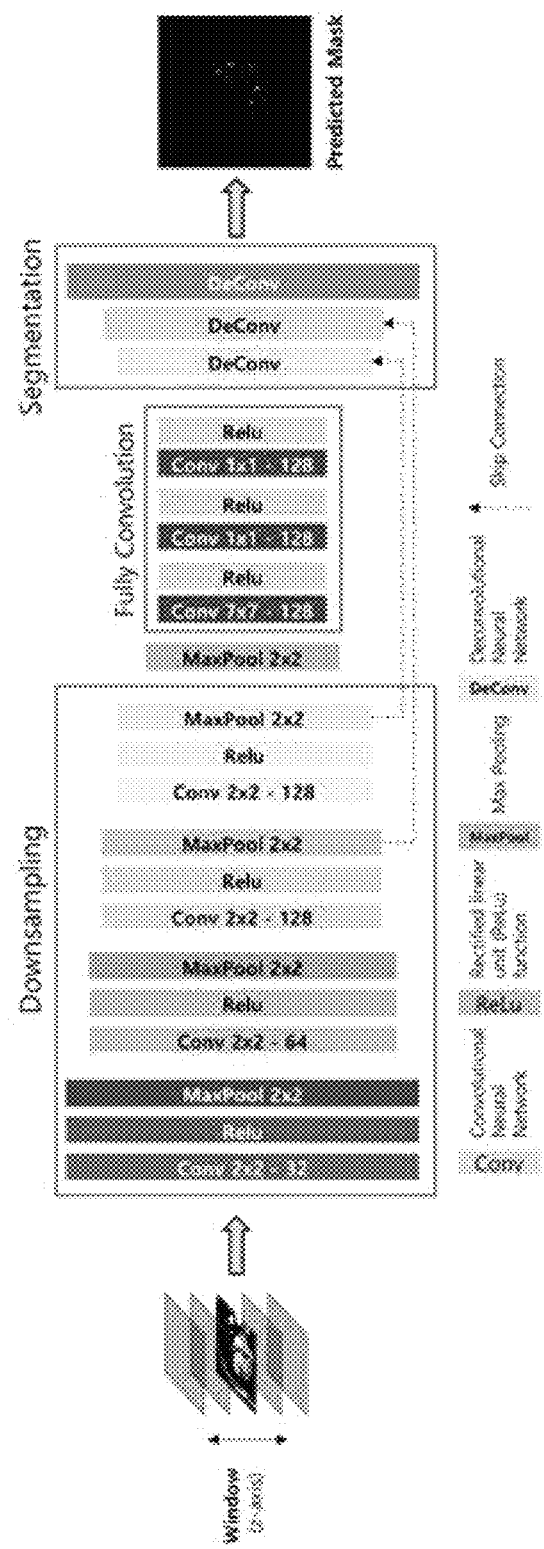
FIG. 6 is an explanatory diagram showing the structure of a fully convolutional network (FCN), which is a type of a convolutional neural network (CNN).

FIG. 6 shows the structure of a fully convolutional network (FCN), which is a type of convolutional neural network (CNN). CNN or FCN neural network learning is referred to as deep learning or artificial intelligence (AI) learning. The FCN is implemented by a tensor flow among python open libraries, which is most efficient and widely used in the related art. In the present invention, the FCN is configured to perform down-sampling by constructing four layers with one set of Convolution, Relu and Maxpooling. In addition, the final part of the neural network is composed of three Deconvolution layers to perform up-sampling and segmentation at the same time. Furthermore, a layer for skip-connection is formed between the layers for performing down-sampling and up-sampling. The skip-connection plays a role of losing information on local features and allowing information on global features to become dominant as the deep learning layer deepens. The skip-connection technique is applied to solve a problem that it is difficult to accurately segment a blood vessel lumen area while easily finding the location of a blood vessel from medical images. When the skip-connection is used, the feature information of an immediately preceding layer where the loss of local feature information may occur is stored and combined with the feature information of the layer where the global feature information is dominant. Therefore, it is possible to solve the problem of the blood vessel lumen (area).

The learning of the artificial intelligence neural network composed of the FCN uses ADAM (Adaptive Moment Estimation), which is the most optimized technique among gradient descent algorithms, thereby repeatedly updating weights and biases, and allowing cross entropy to converge to a minimum value. In order to minimize cross entropy, initial learning is performed through about 100,000 iterations. Non-patent Documents 3 and 4 disclose techniques for the CNN and the FCN.

Figure 7:
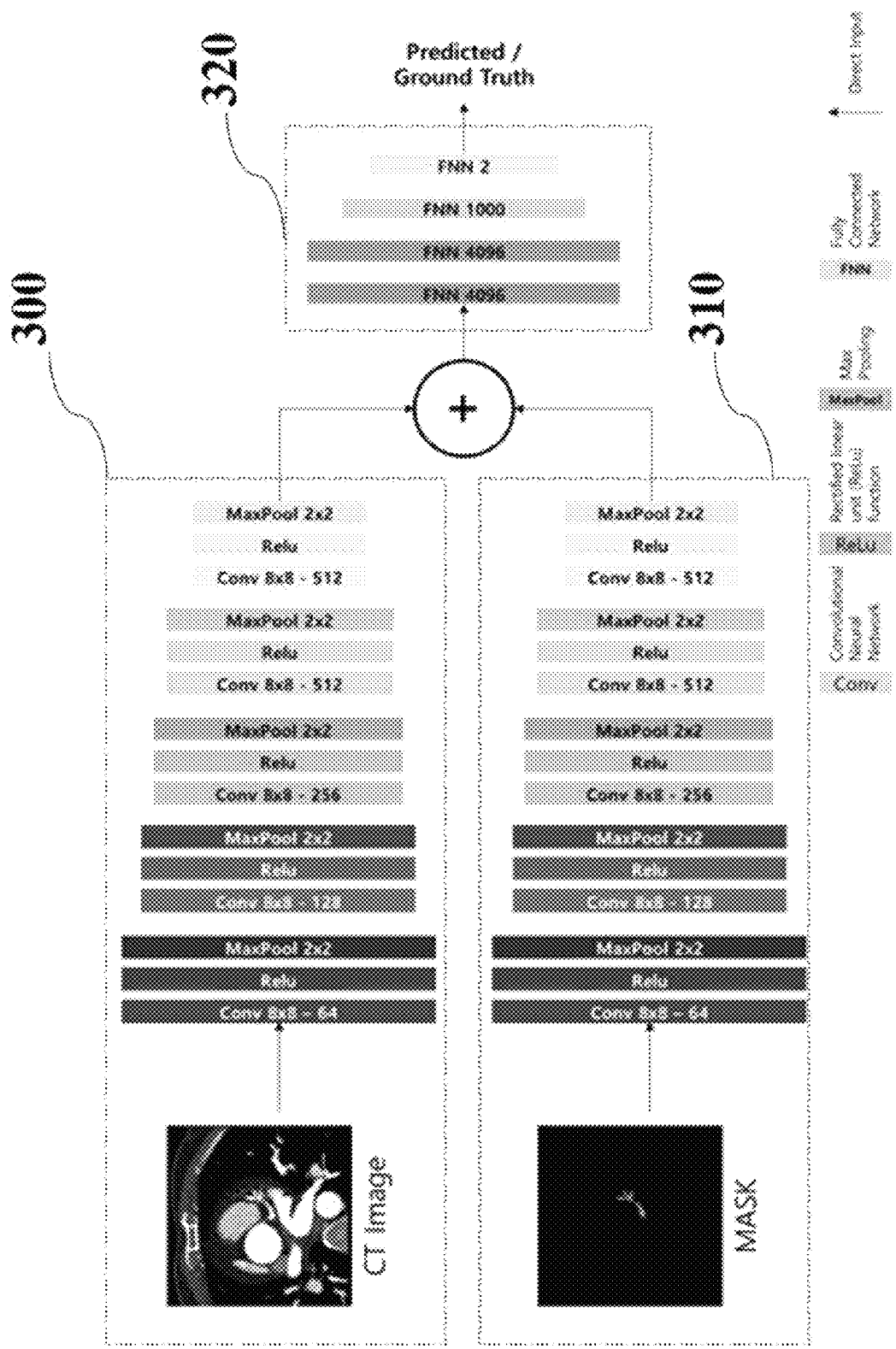
FIG. 7 is a schematic diagram showing a GAN algorithm used in the present invention.

In addition, a generative adversarial network (GAN) algorithm may be additionally applied to improve the accuracy of a deep learning neural network. FIG. 7 is a schematic diagram of the GAN algorithm used in the present invention. The GAN algorithm uses the developed FCN, which is a neural network for blood vessel segmentation, as a generator module 300, and develops and integrates an inspector module 310, which is a neural network for inspecting a segmentation result. The outputs of the generator module 300 and the inspector module 310 are transmitted to a fully connected neural network 320. In the min-max problem of the inspector module 310 and the generator module 300, the inspector module 310 performs learning to approximate the max value of 1, and the generator module 300 performs learning to create a value approximating the min value of 0. The fully connected neural network 320 is composed of 4 layers in total. As in other layers, a Relu function is used as the activation function. The fully connected neural network 320 inspects whether the inputted mask image is a real image or a fake image outputted from the generator module. In general, the GAN model simultaneously learns two neural networks from the beginning and corrects variables by applying a gradient of an inspector to the generator module. However, in the present invention, the learning process is performed at two stages. In the present invention, two neural networks are simultaneously learned. However, in the initial learning stage, the gradient of the inspector is not transmitted to the generator module. In the initial learning process performed through about 100,000 iterations, the generator module is learned in such a direction as to find and simulate a probability distribution of actual ground truth data. When the model converges after initial learning, additional learning is performed. At this time, the gradient of the inspector module is inputted into the generator module to re-correct the weights and biases. The learning of the GAN algorithm can be said to be a competitive method for solving a kind of min-max problem. Non-patent Document 5 discloses a technique for GAN learning.

The learning step of the artificial intelligence neural network according to the present invention includes: a step of converting original files in a DIOCM format, which are a plurality of two-dimensional tomographic medical images, into a bitmap image (BMP) to use the original files as data for use in learning; a step of storing the bitmap image (BMP) to segment a blood vessel in a plurality of two-dimensional tomography images and use the segmented blood vessel as labeling data for learning; a step of performing pre-processing to generate a mask image through the labeling data processed so as to be directly used for neural network learning; and a step of enabling a FCN to perform learning from the bead map image and the mask image.

In addition, it is possible to enable the GAN algorithm to additionally perform learning through the artificial intelligence neural network according to the present invention. The learning step of the artificial intelligence neural network for enabling a GAN algorithm to additionally perform learning according to the present invention includes: a step of inputting a pair of data, which is obtained by converting two-dimensional tomography images stacked on a Z-axis into bitmap images through original files stacked on the Z-axis, and an image masked in a pre-processing step, to a fully convolutional network (FCN) algorithm (generator module); a step of supplementing image information by constructing a skip-connection between initial three layers of the FCN and subsequent three de-convolutional layers; a step of allowing adaptive moment estimation (ADAM), which is a gradient descent algorithm, to perform initial learning for a variable so that cross entropy is minimized; a step of developing an inspector module for applying a generative adversarial network (GAN) algorithm to a neural network; a step of discriminating images by randomly inputting a fake image or a masked image (real image) outputted from the FCN, which is a generator module, into the inspector module; a step of performing competitive learning through the use of a min-max problem of the inspector module and the generator module by repeating the above steps; and a step of applying a gradient of an inspector to the generator module to correct weights and biases, and tracking a variable that further minimizes the cross entropy as compared with the above steps.

Figure 8:
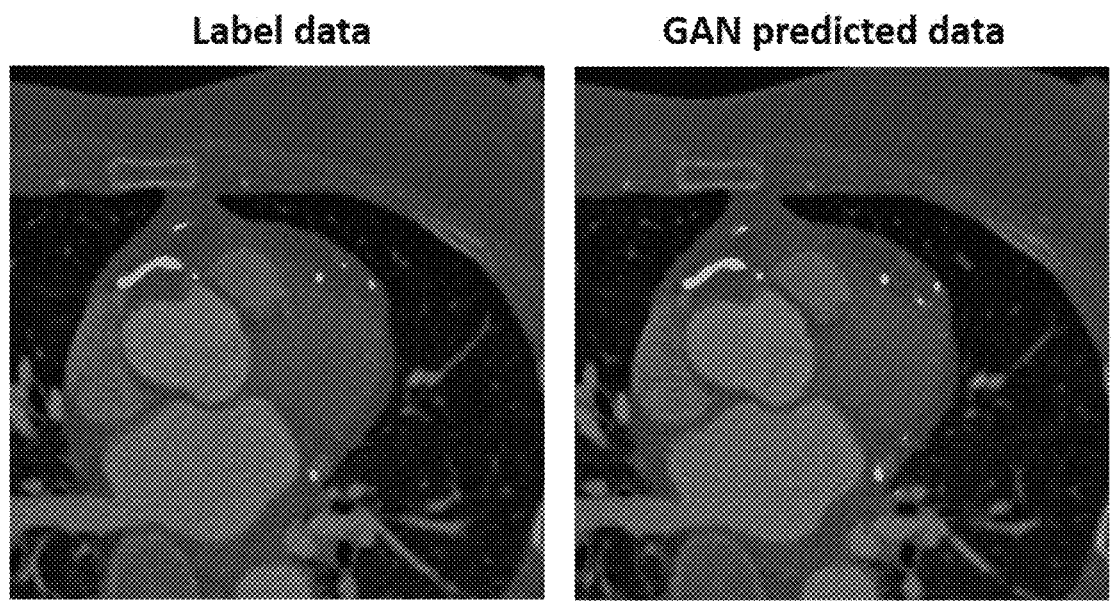
FIG. 8 shows images that indicate a result of processing one cardiac CT slice by a machine learning segmentation program according to the present invention.
Figure 9:
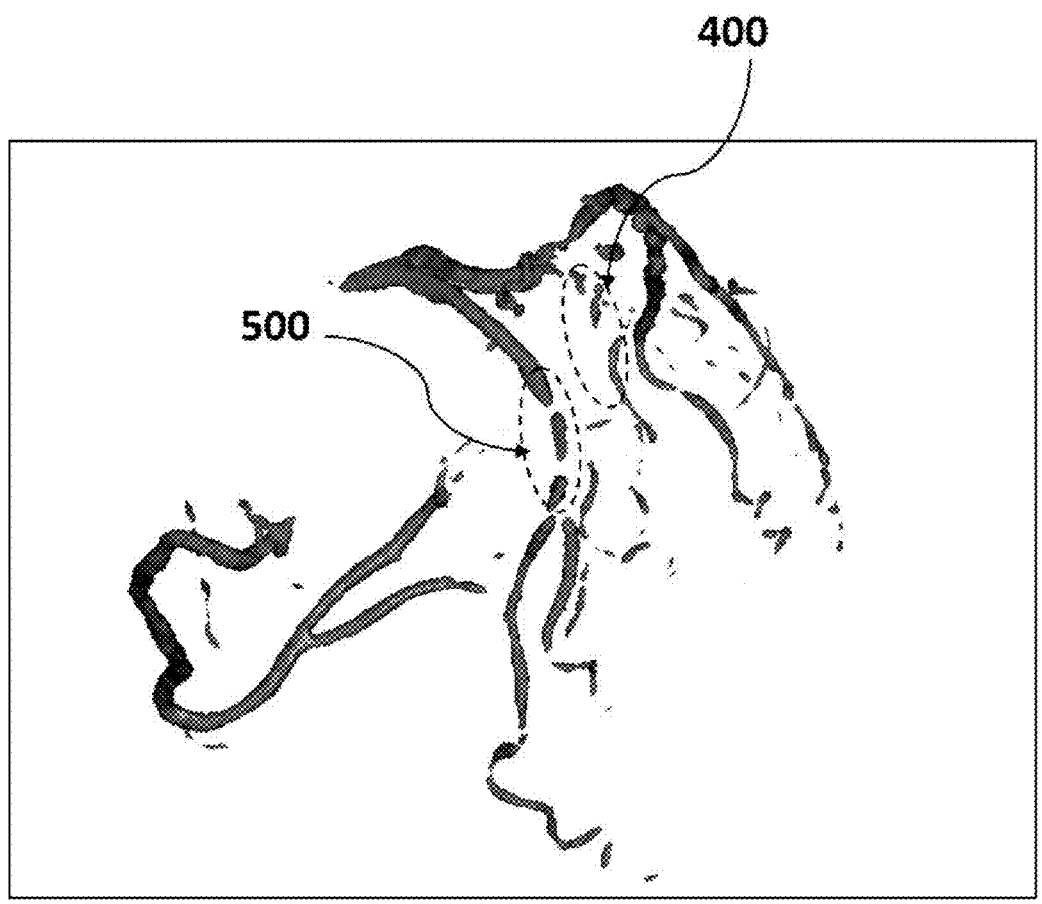
FIG. 9 is a three-dimensional shape diagram of a coronary artery that indicates a result of processing a three-dimensional cardiac CT image of a patient by a machine learning segmentation program according to the present invention.

The machine learning segmentation program 110 according to the present invention includes an algorithm learned by the above method. However, the present invention is not limited thereto. The machine learning segmentation program 110 may include other known machine learning (deep running) algorithms. FIG. 8 shows images that indicate a result of processing one cardiac CT slice by the machine learning segmentation program according to the present invention. FIG. 9 is a three-dimensional shape diagram of a coronary artery that indicates a result of processing a three-dimensional cardiac CT image of a patient by the machine learning segmentation program according to the present invention.

In the case of performing segmentation on one cardiac CT slice with the machine learning segmentation program 110, as shown in FIG. 8, it can be seen that the segmentation for the blood vessel region is well performed. In the case of performing segmentation for 200 to 300 cardiac CT slices of a patient, as shown in FIG. 9, it can be seen that there is a portion 400 where a non-vessel region is segmented and a missing portion 500 where a blood vessel region is not segmented.

In general, the three-dimensional shape machine-learning blood vessel data 120 generated by the machine learning segmentation program 110 is inaccurately segmented data which includes a noise data set having a segmented portion other than blood vessels and a missing data set having no data of a blood vessel region.

In the present invention, in order to supplement the inaccurate three-dimensional shape machine-learning blood vessel data 120, there is performed a step of secondarily segmenting and correcting the three-dimensional shape machine-learning blood vessel data 120 primarily segmented by the machine learning algorithm through the use of the image processing segmentation program 130.

Figure 10:
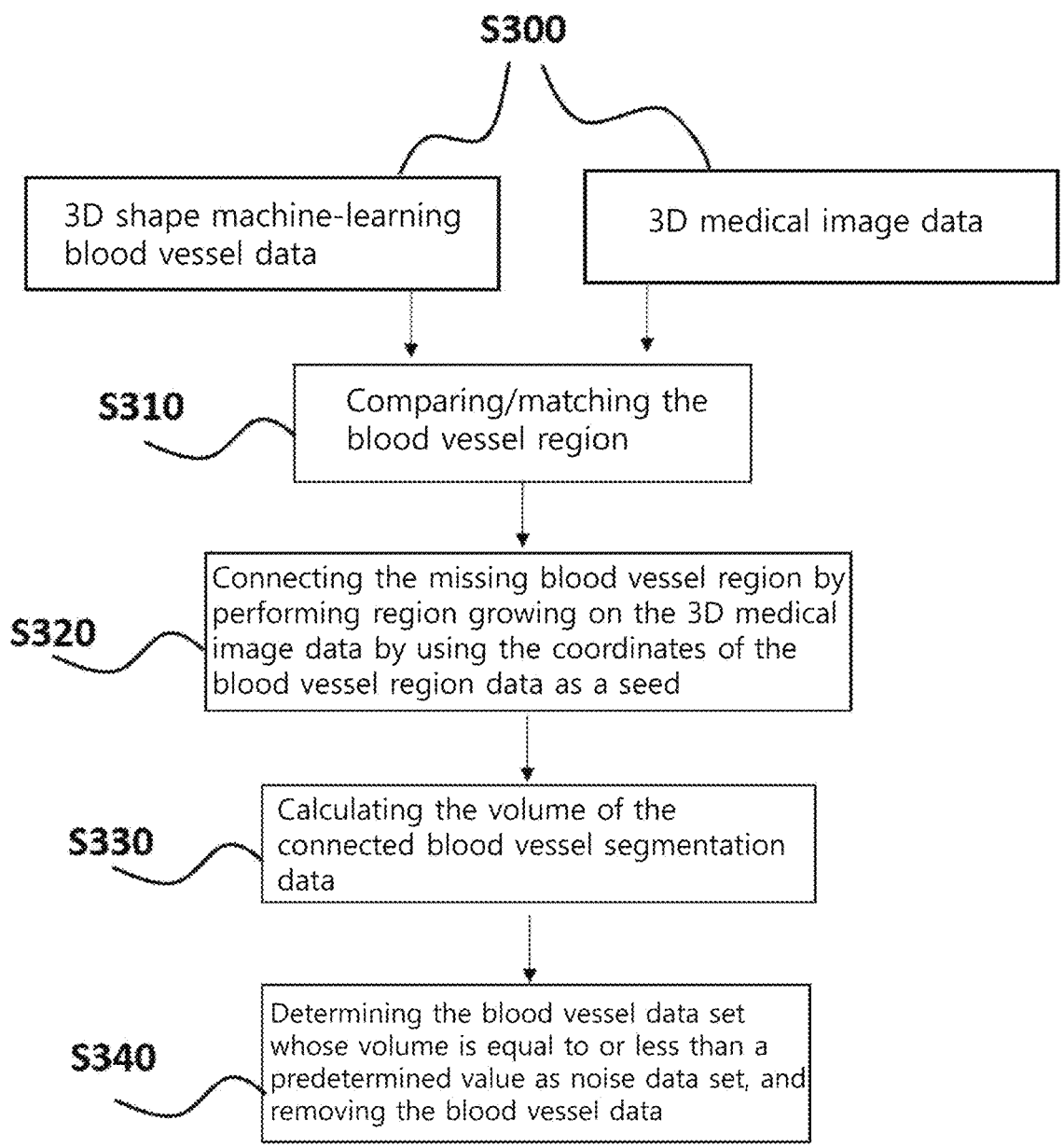
FIG. 10 is a flowchart of a secondary segmentation procedure performed in an image processing segmentation program according to the present invention.

FIG. 10 is a flowchart of a secondary segmentation procedure performed through the use of the image processing segmentation program according to the present invention. Referring to FIG. 10, first, inaccurate three-dimensional shape machine-learning blood vessel data 120 and three-dimensional medical image data 100 are inputted to the image processing segmentation program 130 (S300). Next, the inaccurate three-dimensional shape machine-learning blood vessel data 120 and the three-dimensional medical image data 100 are compared in the image processing segmentation program 130 to match coordinates of blood vessel region data (S310). Next, region growing is performed on the three-dimensional medical image data 100 by using the coordinates of the blood vessel region data matched by the image processing segmentation program 130 as a seed to connect the missing blood vessel region (S320). The connection of the missing portion 500 can also be performed by an image processing method other than the region growing method. Next, in order to remove the noise data set (the data set in which a region other than a blood vessel is indicated as a blood vessel), the volume of each of the blood vessel segmentation data sets connected by the image processing segmentation program 130 is calculated (S330). The blood vessel data set whose volume is equal to or less than a predetermined value is determined as noise data set and removed (S340).

Figure 11:
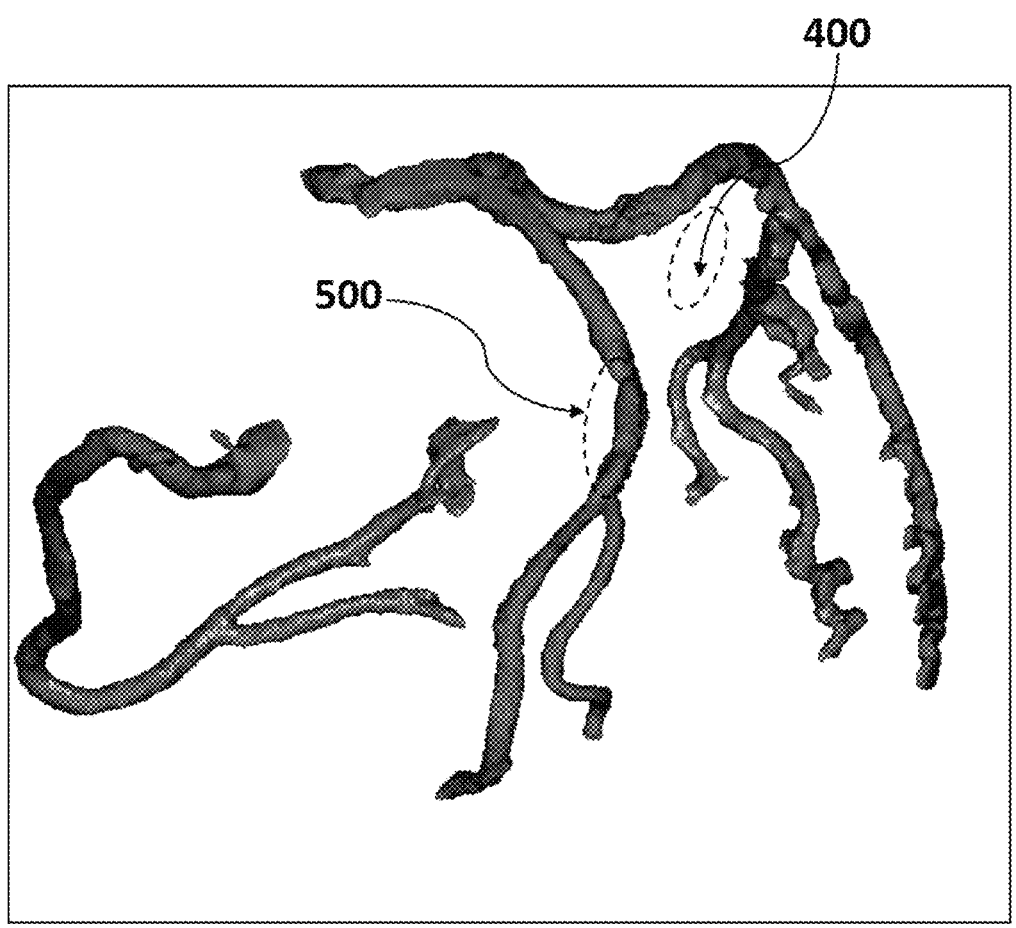
FIG. 11 is a three-dimensional shape diagram of a coronary artery showing a result obtained by secondarily segmenting the primary segmentation result of FIG. 9 performed in the image processing segmentation program according to the present invention.

FIG. 11 is a three-dimensional shape diagram of a coronary artery showing a result obtained by secondarily segmenting the primary segmentation result of FIG. 9 performed in the image processing segmentation program according to the present invention. Referring to FIG. 11, it can be seen that the noise portion 400 obtained by segmenting the portion other than the blood vessel shown in FIG. 9 is removed, and the missing portion 500 composed of a non-segmented blood vessel portion is connected.

The central idea of the present invention is to supplement the noise and the missing portion by firstly segmenting the three-dimensional shape blood vessel data through the use of a machine learning segmentation program, and then secondarily segmenting the three-dimensional shape blood vessel data by using the segmentation result as a seed in the image processing program. Hereinafter, a method according to another embodiment of the present invention will be described based on the central idea of the present invention.

The method for automatically segmenting a blood vessel with a three-dimensional medical image according to the present invention, which is a method for segmenting three-dimensional medical image data from a three-dimensional medical image of a patient through the use of a computer, includes: a step of receiving three-dimensional medical image data of a patient; a step of generating primary three-dimensional shape blood vessel data by processing the three-dimensional medical image data of the patient inputted through the use of an artificial intelligence neural network;

and a step of generating secondary three-dimensional shape blood vessel data by processing the primary three-dimensional shape blood vessel data, wherein the step of generating the secondary three-dimensional shape blood vessel data generates the secondary three-dimensional shape blood vessel data by using the primary three-dimensional shape blood vessel data as a seed. In the present invention, the artificial intelligence neural network may include a CNN or a FCN.

In some embodiments, the step of generating the primary three-dimensional shape blood vessel data through the use of the artificial intelligence neural network may include: a step of constructing the artificial intelligence neural network; a step of causing the artificial intelligence neural network to perform learning by processing three-dimensional medical images of a plurality of patients; and a step of primarily segmenting the three-dimensional medical images of the patients, which is not used as a learning material in the learned artificial intelligence neural network. In addition, the step of constructing the artificial intelligence neural network may include: a step of constructing a FCN for initial learning; a step of using the FCN as a generator module to improve the neural network performance by applying a GAN algorithm; and a step of constructing an inspector module to perform the GAN algorithm.

In the present invention, the three-dimensional shape blood vessel data primarily generated through the use of the artificial intelligence neural network is composed of at least one noise data set other than a blood vessel region and at least one missing data set in which the blood vessel region is missing.

In some embodiments, the step of generating the secondary three-dimensional shape blood vessel data includes: a step of matching the blood vessel region by comparing the primary three-dimensional shape blood vessel data with the received three-dimensional image data; a step of connecting the blood vessel by supplement the missing data set; and a step of removing the noise data set. In addition, the step of connecting the blood vessel by supplementing the missing data set may connect the missing data region through the use of a region growing algorithm for the blood vessel region of the inputted three-dimensional image data by using coordinate information of the generated primary three-dimensional shape blood vessel data as a seed. In addition, the step of removing the noise data set may include: a step of calculating a volume of the three-dimensional blood vessel data sets to which a missing data region is connected; a step of determining a blood vessel data set whose calculated volume is equal to or less than a predetermined value as noise data; and a step of removing the blood vessel data set.

The above-described embodiment is merely a description of a preferred embodiment of the present invention, and the scope of the present invention is not limited to the above-described embodiment. The idea of the present invention may be subjected to various changes, modifications, or substitutions by those skilled in the art, and such embodiments should be understood to fall within the scope of the present invention. For example, the machine learning segmentation program can be configured in various ways, and various image processing segmentation programs for correcting incomplete three-dimensional shape machine-learning blood vessel data generated by the machine learning segmentation program can be implemented.

What is claimed is:

1. A method for automatically segmenting three-dimensional blood vessel data from three-dimensional medical image data of a patient through the use of a computer, comprising:
receiving the three-dimensional medical image data of the patient;
generating three-dimensional shape machine-learning blood vessel data from the received three-dimensional medical image data through the use of a machine-learned segmentation program so as to generate three-dimensional blood vessel data; and
generating corrected three-dimensional shape blood vessel data from the received three-dimensional medical image data and the generated three-dimensional shape machine-learning blood vessel data through the use of an image processing program,
wherein the three-dimensional machine-learning blood vessel data is composed of at least one noise data set other than a blood vessel region and a data set in which the blood vessel region is missing, and
the image processing program is configured to compare the received three-dimensional medical image data and the generated three-dimensional shape machine-learning blood vessel data to match the blood vessel region, supplement the missing data set, and remove the noise data set, so as to generate corrected three-dimensional shape blood vessel data.

2. The method of claim 1, wherein the machine-learned segmentation program includes a FCN algorithm.

3. The method of claim 2, wherein the FCN algorithm of the machine-learned segmentation program is configured to convert axial slice images of three-dimensional medical images into bitmap images, label a blood vessel region of each of the converted bitmap images, convert each of the labeled bitmap images into a mask image to utilize the mask image as learning data, and perform learning by using each of the labeled bitmap images and the mask image as a pair.

4. The method of claim 3, wherein the machine-learned segmentation program further includes a GAN algorithm.

5. The method of claim 1, wherein the image processing program is configured to supplement the missing data set through the use of a region growing algorithm for the blood vessel region of the received three-dimensional medical image data by using coordinate information of the generated three-dimensional shape blood vessel data as a seed, calculate a volume of the three-dimensional shape blood vessel data sets to which the missing data region is connected, determine blood vessel data whose calculated volume is equal to or less than a predetermined value as a noise data set, and remove the noise data set.

6. A system for automatically segmenting three-dimensional blood vessel data from three-dimensional medical image data of a patient through the use of a computer, comprising:
a computer installed with a computer program for performing the method of claim 1.

* * * * *